United States Patent [19]

Willis

[11] 4,335,335
[45] Jun. 15, 1982

[54] TELEVISION RECEIVER HIGH VOLTAGE PROTECTION CIRCUIT

[75] Inventor: Donald H. Willis, Indianapolis, Ind.

[73] Assignee: RCA Corporation, New York, N.Y.

[21] Appl. No.: 120,473

[22] Filed: Feb. 11, 1980

[51] Int. Cl.³ .......................................... H01J 29/80
[52] U.S. Cl. .................................... 315/411; 315/379; 358/243
[58] Field of Search ................. 315/411, 379; 358/243

[56] References Cited

U.S. PATENT DOCUMENTS

| | | | |
|---|---|---|---|
| 3,692,932 | 9/1972 | Wilmarth | 178/7.5 R |
| 3,725,739 | 4/1973 | Griffey | 317/16 |
| 3,898,522 | 8/1975 | Klein et al. | 315/379 |
| 3,928,787 | 12/1975 | Geiger | 315/379 X |
| 4,042,858 | 8/1977 | Collette et al. | 315/379 |
| 4,045,742 | 8/1977 | Meehan et al. | 315/411 X |
| 4,073,004 | 2/1978 | Chambers et al. | 363/79 |
| 4,090,111 | 5/1978 | Suzuki | 315/411 |
| 4,101,815 | 7/1978 | Willis | 315/411 |
| 4,126,816 | 11/1978 | Willis | 315/411 |
| 4,185,234 | 1/1980 | Baker | 315/411 |
| 4,213,166 | 7/1980 | Watanabe | 315/411 X |
| 4,287,535 | 9/1981 | Vakil | 358/243 |

OTHER PUBLICATIONS

"Servicing the CTC 99 and 101 Color Chassis Television Workshop-20" Prepared by RCA Corporation Technical Training, 1st Edition 7928–First Printing Copyright 1979 by RCA Consumer Electronics, U.S.A.
Hitachi CU-150 Solid State Color Television Service Manual, No. 344, CQ3DX Chassis, pp. 1-9, & Electrical Schematic, Oct. 1976.
Electrical Schematic, Magnavox T989 Color Television Chassis, Manual No. 7343, Section 4.1, Fourth Issue: Mar. 1975.

Primary Examiner—Malcolm F. Hubler
Attorney, Agent, or Firm—Paul J. Rasmussen; William H. Meagher; Joseph Laks

[57] ABSTRACT

A television receiver high voltage generator includes a high voltage transformer for developing an ultor accelerating potential at an ultor output terminal. A high voltage protection circuit comprises a comparator and a disabling circuit coupled to an output terminal of the comparator. An ultor accelerating potential representative signal is applied to an input terminal of the comparator to disable normal television receiver operation when the ultor accelerating potential exceeds predetermined values. To avoid nuisance tripping or energization of the disabling circuit at lower beam current levels, beam current information is applied to an input terminal of the comparator such that at low beam current operating levels, a greater ultor accelerating potential must be exceeded before the disabling circuit is energized, than at high beam current operating levels. The beam current information is applied to the comparator through an amplifier having an output terminal coupled to an input terminal of the comparator and having a beam current representative signal applied to the input terminal of the amplifier. Biasing of the amplifier is such that over a substantial range of ultor beam current values, the amplifier exhibits a certain gain characteristic but exhibits a substantially different gain characteristic outside this range in order to provide the disabling circuit with an overcurrent shutdown capability.

15 Claims, 3 Drawing Figures

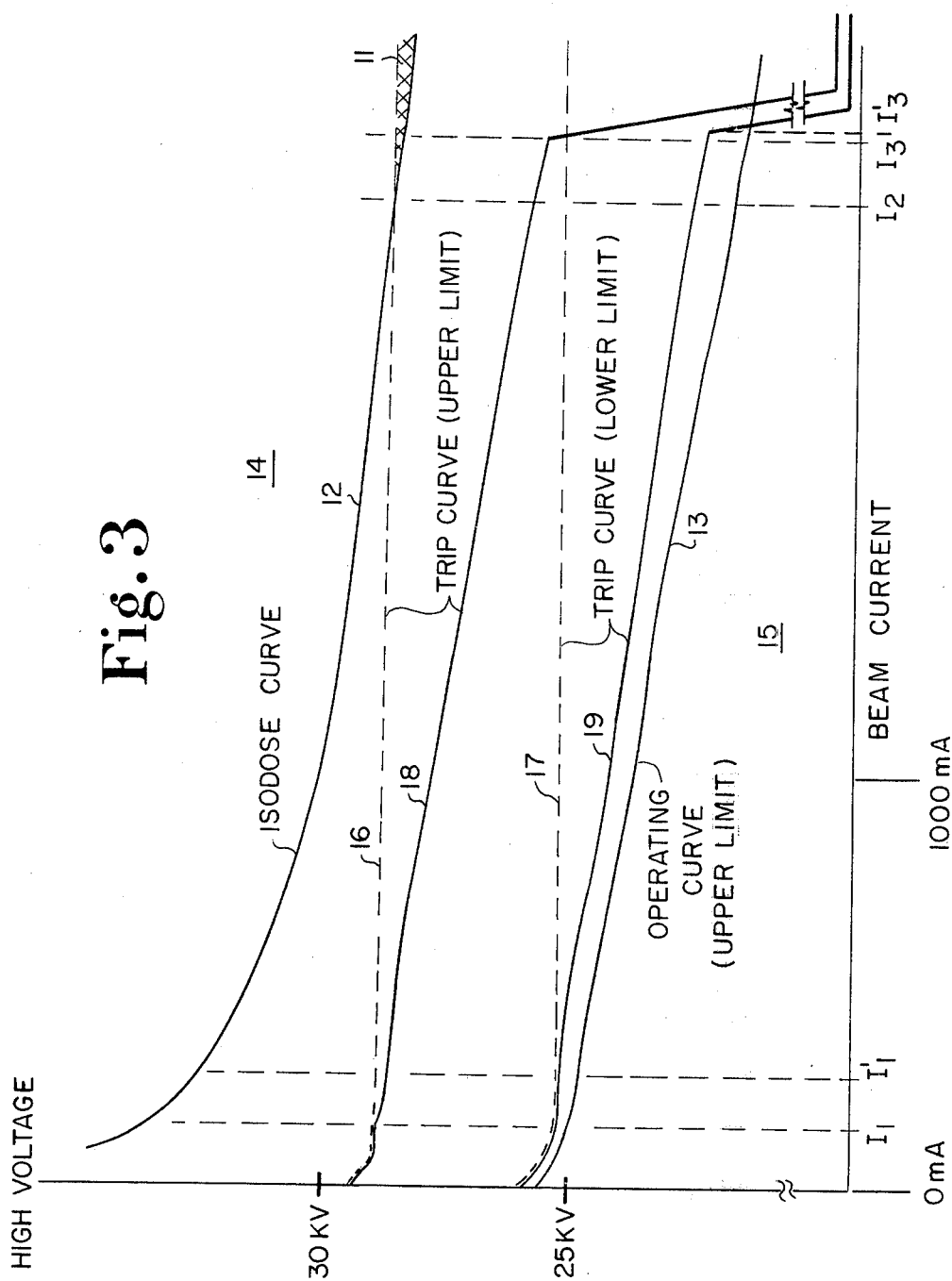

TELEVISION RECEIVER HIGH VOLTAGE PROTECTION CIRCUIT

This invention relates to high voltage protection circuits for a television display system.

In a typical television display system, a high voltage ultor accelerating potential is applied to the final anode electrode of a picture tube to accelerate an electron beam generated at a picture tube cathode onto a phosphor screen. When the electron beam impinges on the phosphor particles of the phosphor screen, the phosphor particles emit radiation in the visible region. The amount of visible radiation emitted by the phosphor particles is a function of the magnitude of the ultor accelerating potential. The higher the ultor accelerating potential, the greater the phosphor emission at a given input signal level. Relatively large ultor accelerating potentials are therefore desirable in order to provide relatively high brightness picture tubes. In a television receiver with a shadow mask type color picture tube, ultor accelerating potentials of 30 kilovolts are typically generated for high brightness picture tubes.

Because the electron beams of a color picture tube are accelerated to a relatively high velocity before they impinge on the shadow mask and phosphor screen, a certain amount of X-radiation emission accompanies the emission of visible radiation by the phosphor particles. Almost all the emitted X-radiation is absorbed by the picture tube glass envelope and faceplate and adjacent metallic structures such as the magnetic shield. Under normal ultor accelerating potential and beam current operating conditions, the amount of X-radiation not absorbed by the picture tube and adjacent structures is maintained at an extremely low level, quite insufficient to be harmful to any nearby observer of the television receiver.

To ensure that the television receiver will not be operated, under fault conditions, at excessive emission levels of X-radiation, a high voltage protection circuit is incorporated in the television receiver circuitry such that an abnormal display is presented should the ultor accelerating potential approach unacceptable levels.

A characteristic curve or isodose curve of high voltage or ultor accelerating potential versus ultor beam current may be computed for a particular television display system. Such a typical isodose curve is illustrated in FIG. 3 as the curve 12. Operation of the display system or television receiver in the region 14 above isodose curve 12 should be avoided in order to ensure that the observer is not exposed to any significant amounts of X-radiation.

The amount of X-radiation emitted is proportional to the product $(U)^m(I)^n$, where U equals the ultor accelerating potential and I equals the ultor beam current flowing out of the ultor terminal, and m, n positive numbers. Since the amount of X-radiation emission increases with increasing ultor beam current, isodose curve 12 generally departs from a horizontal straight line such that at higher beam current levels, the television receiver should be operated at lower high voltage levels in order to be operating in the region well below region 14.

Many television receivers incorporate a high voltage protection circuit which disables normal television receiver operation should a fault condition arise wherein the high voltage generated approaches values which would result in the television receiver being operated above isodose curve 12 in region 14. In a conventional television receiver high voltage protection circuit, a retrace pulse voltage, developed across a flyback transformer secondary winding, is rectified and filtered to provide a DC voltage representative of the ultor accelerating potential. A comparator compares the DC input voltage with a reference voltage and energizes a disabling circuit should the ultor accelerating potential, as represented by the DC input voltage, exceed predetermined values.

For a high voltage protection circuit wherein the only signal voltage applied to the protection circuit comparator is one representative only of high voltage, characteristic disabling or trip curves such as dashed-line curves 16 and 17 of FIG. 3 may be computed. Consider, for example, a particular television receiver which has a trip curve 17 associated with its high voltage protection circuit. Under normal operating conditions of ultor accelerating potential and beam current, the high voltage developed at the ultor terminal at various beam current levels is such that the television receiver is operated below the curve 13, within the region 15, illustrated in FIG. 3.

Operating curve 13 is determined experimentally as representing the maximum high voltage obtainable at the ultor terminal for a given beam current level under normal operating conditions when all significant circuit component tolerances and component value changes with temperature are taken into consideration. Curve 13 represents a typical operating curve of a television receiver insasmuch as the curve has a downward slope or tilt such that the ultor accelerating potential developed by the high voltage circuit is reduced at the higher beam current levels.

If, under a fault condition, the television receiver is operated at a high voltage which takes the receiver operation outside of region 15 and above the trip curve 17, the high voltage protection circuit energizes the disabling circuit to disable normal television receiver operation. Thus, since trip curve 17 is well below the isodose curve 12, normal television receiver display cannot be maintained under abnormal high voltage conditions approaching the high voltage values of isodose curve 12.

Typical high voltage protection circuits, wherein a DC voltage representative of the ultor accelerating potential is applied to an input terminal of a comparator, have characteristic trip curves of the shape illustrated by the curves 16 and 17 of FIG. 3. The trip curves exhibit a relatively shallow slope or tilt over a relatively wide range of beam current levels. Trip curve 17 represents the lower limit curve of the disabling curve associated with the high voltage protection circuit when component tolerances and variations of component values with temperature are taken into consideration; whereas curve 16 represents the upper limit curve.

To avoid unnecessarily disabling normal television receiver operation at the lower beam current operating levels, the values of certain critical components in the high voltage protection circuit are selected such that the lower limit trip curve 17 is located above the upper limit operating curve 13 even for low beam current levels near levels $I_1$ and $I_1'$ illustrated in FIG. 3.

If the high voltage protection circuit component values are selected to avoid unnecessary or nuisance disabling of those television receivers exhibiting a lower limit trip curve such as curve 17, unsatisfactory high voltage protection circuit operation may be exhibited by other television receivers. For example, in a given television receiver with circuit component values which differ from the nominal values such that the upper limit trip curve 16 applies, this television receiver could be operated under fault conditions at beam current levels greater than $I_2$ in the crosshatched region 11 of FIG. 3, with high voltage values above those of isodose curve 12 but which are, nevertheless, still below those of upper limit trip curve 16.

In practice, it is difficult to select nominal high voltage protection circuit component values which will ensure disabling of normal television receiver operation under excessive ultor accelerating potential conditions at the high beam current levels yet not result in nuisance disabling at the low beam current levels.

A feature of the invention is to enable the high voltage protection circuit to operate properly at both low and high beam current levels of operation. A second input signal representative of the magnitude of ultor beam current is applied to an input terminal of the comparator such that for high beam current levels, the disabling circuit is energized at a lower high voltage than for lower beam current values. Because of the addition of beam current information to the comparator input, the characteristic trip curves associated with the high voltage protection circuit including the upper limit and lower limit trip curves more closely follow the slope or tilt of the upper limit operating curve 13, as illustrated in FIG. 3 by the lower limit trip curve 19 and by the upper limit trip curve 18.

A second feature of the invention is to incorporate into the high voltage protection circuit an overcurrent shutdown or disabling function which disables normal television display under excessive beam current loading conditions even when the high voltage generated is insufficient to otherwise energize the disabling circuit. The overcurrent shutdown function is accomplished by applying the beam current representative input signal to an input terminal of an amplifier having its output terminal coupled to an input terminal of the high voltage protection circuit comparator. The biasing of the amplifier is such that the amplifier exhibits a given gain characteristic over a substantial range of beam current values below a preestablished beam current level. Operation of the amplifier in this manner introduces the required tilt to the characteristic trip curves of the high voltage protection circuit in order that they more closely follow the slope of the television receiver upper limit operating curve, as is required to avoid nuisance disabling at the lower beam current levels. If the ultor beam current exceeds a preestablished level, the biasing changes such that the amplifier exhibits a substantially different gain characteristic. Specifically, the amplifier becomes biased near or at cutoff thereby applying a relatively large input voltage to the comparator in order to energize the disabling circuit at all beam current levels exceeding the preestablished level.

In a specific embodiment of the invention, the amplifier biasing means includes a degenerative feedback path between the input and output terminals of the amplifier, the feedback path being operative at beam current levels below the preestablished level. The degenerative feedback is disabled when the beam current exceeds the preestablished level, thereby substantially increasing the gain of the amplifier such that even slight further increases in the beam current level biases the amplifier into cutoff.

FIG. 3 illustrates various curves of high voltage versus beam current associated with operation of the system of FIG. 1 and the circuit of FIG. 2.

Figure 1:
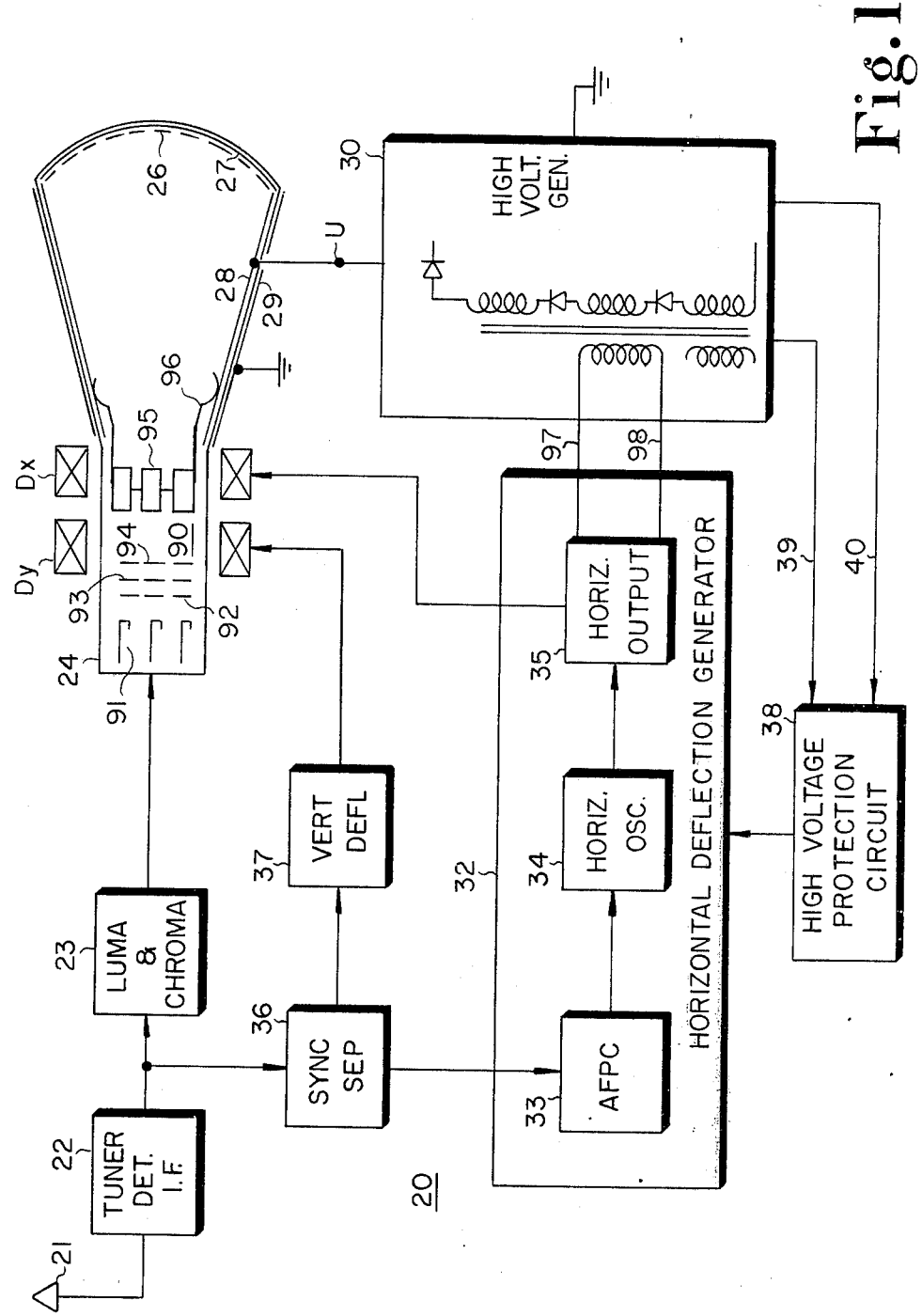
FIG. 1 illustrates in a functional block schematic a television display system embodying the invention.

In a television display system or television receiver 20, illustrated in FIG. 1, video signal information is received by an antenna 21 and applied to a tuner, intermediate frequency and video detector 22. The detected composite video signals are applied to luminance and chrominance processing circuitry 23 to provide video drive signals to an electron gun structure 90, schematically illustrated, of a picture tube 24. Color picture tube 24 includes a metallic, apertured shadow mask 26 located adjacent a phosphor screen 27 deposited on the faceplate of the picture tube. Shadow mask 26 is interposed between the electron gun structure and the phosphor screen.

Electron gun structure 90 comprises a cathode assembly 91 which generates three electron beams and modulates the intensity of these beams in accordance with the video signal information provided by the luminance and chrominance processing circuit 23. A grid electrode assembly 92, a screen electrode assembly 93, and a focus electrode assembly 94 aid in modulating, focusing and accelerating the emitted electron beams toward the phosphor screen 27 deposited on the faceplate of the color picture tube. Final acceleration of the electron beams is provided by an anode electrode assembly 95 which is maintained at a high potential relative to the voltages applied to the other electrodes of the electron gun structure. The high potential or ultor accelerating potential is developed across inner and outer conductive coatings 28 and 29 deposited on the funnel of picture tube 24. Spring contacts 96 then apply this potential to anode assembly 95.

The electron beams, generated by cathode assembly 91, modulated, focused, and accelerated by electrode assemblies 92-95, travel through the apertures of shadow mask 26 to impinge on the phosphor particles of phosphor screen 27, causing the particles to emit visible radiation. The electron beams, when in the vicinity of the magnetic field generated by a horizontal deflection winding $D_x$ and a vertical deflection winding $D_y$, are deflected horizontally and vertically to scan a raster on the phosphor screen.

To sycnrhonize raster scanning with the picture information of the composite video signals, the composite video signals are applied to a synchronizing signal separating circuit 36 which separates horizontal and vertical sync signals from the picture information portion of the composite video signals. The vertical sync signals are applied to a vertical deflection circuit 37 which generates synchronized vertical scanning current in the vertical deflecton winding $D_y$.

A horizontal deflection generator 32 generates horizontal scanning current in horizontal deflection winding $D_x$ in order to scan the electron beams in the horizontal direction. Horizontal deflection generator 32 includes an oscillator 34 which applies horizontal deflection rate switching signals to a horizontal output stage 35. In response to these horizontal deflection rate signals, output stage 35 generates the required horizontal sawtooth scanning current waveform in deflection winding $D_x$.

To synchronize horizontal scanning with the picture information of the composite video signals, the phase and frequency of horizontal oscillator 34 is adjusted by a control voltage applied from an automatic frequency and phase control (AFPC) circuit 33. AFPC circuit 33 compares the horizontal sync signal waveform developed by synchronizing signal separator 36 with a horizontal scanning derived waveform such as the retrace pulse voltage waveform developed across horizontal deflection winding $D_x$. Any phase error between the horizontal sync signal and the retrace pulse signal is detected by AFPC circuit 33 which generates a control signal to adjust the phase and frequency of horizontal oscillator 34 so as to synchronize horizontal scanning with the picture information of the composite video signals.

To develop the ultor accelerating potential, an ultor output terminal U of a high voltage generator 30 is connected to the inner conductive coating 28. Alternating current drive signals are applied to high voltage generator 30 along signal lines 97 and 98. A DC ultor accelerating potential is developed at terminal U derived from these alternating current drive signals. In a typical television receiver circuit, these alternating current drive signals correspond to the retrace pulse voltage developed by the horizontal output stage 35 of horizontal deflection generator 32. However, a separate high frequency signal generator may alternatively be used to produce the drive signals.

The electrons impinging on the phosphor screen and shadow mask flow to the inner conductive coating 28 of picture tube 24 and discharge the associated ultor capacitance. To replenish the charge neutralized on the ultor capacitance, beam current flows from ultor terminal U of high voltage generator 30 to the inner conductive coating 28. The amount of beam current flowing varies with the intensity of the modulation of the emitted electron beams in accordance with the picture information of the composite video signals.

When the electron beams impinge on the shadow mask and phosphor screen, X-radiation is emitted, which, under normal operating conditions of high voltage and beam current, is quite minimal. The amount of X-radiation emitted is a function of both the ultor accelerating potential and the beam current levels.

To prevent continued operation of television receiver 20 should the high voltage, under fault conditions, exceed specified levels, high voltage and beam current information is applied to a high voltage protection circuit 38 along respective signal lines 39 and 40. High voltage protection circuit 38 detects the generation of excessive high voltage and applies a disabling signal to the television receiver circuitry to produce an abnormal or blank picture display. The disabling signal may, for example, be applied to horizontal oscillator 34 to increase the oscillator frequency and produce an unviewable display, prompting the observer to turn off the television receiver. Furthermore, for transistorized horizontal output stages and retrace pulse derived ultor accelerating potentials, increasing the horizontal oscillator frequency may result in decreasing the ultor accelerating potential below excessive, fault levels.

Figure 2:
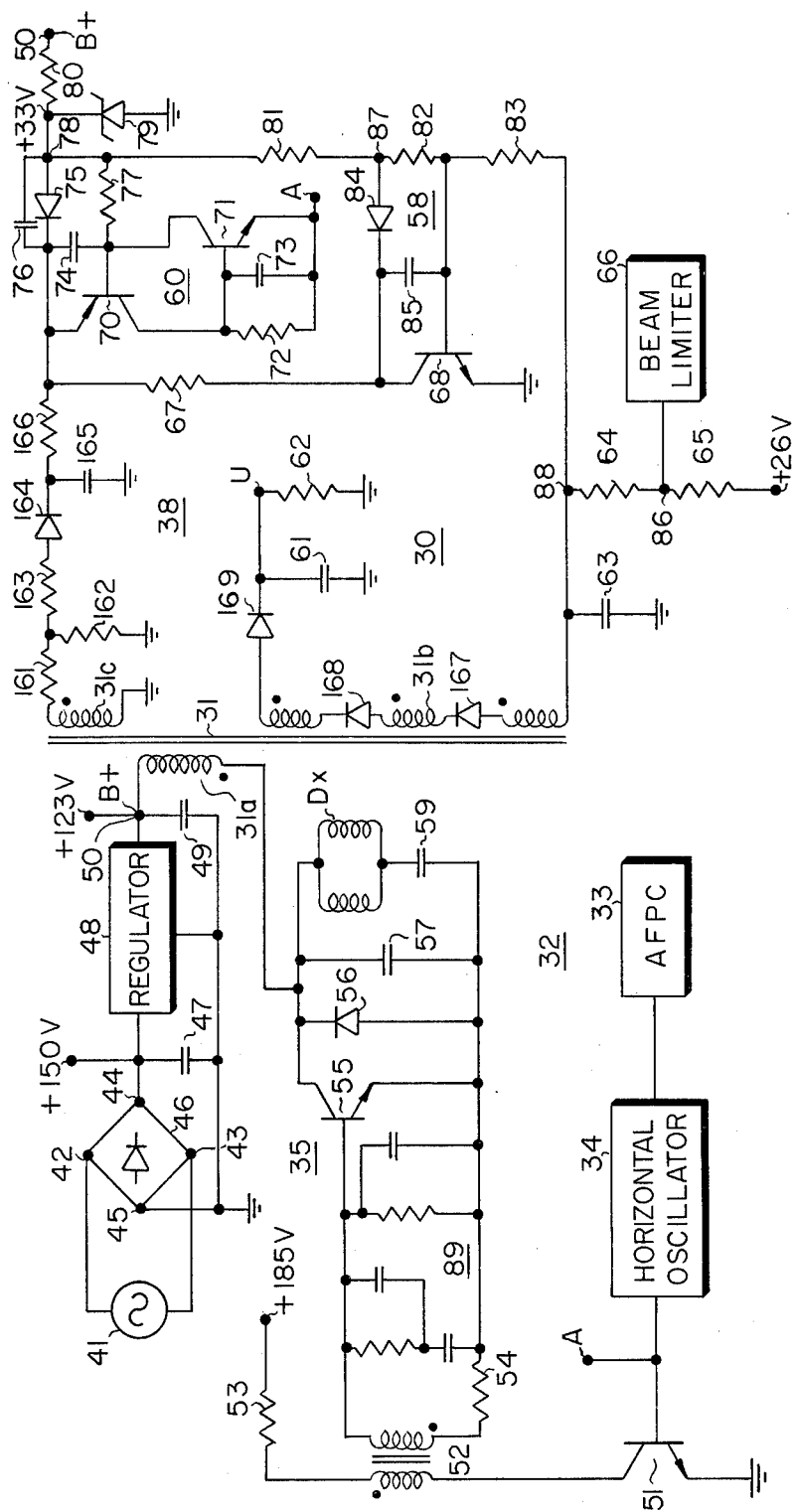
FIG. 2 illustrates in electrical schematic form a portion of the system of FIG. 1 including a high voltage protection circuit embodying the invention.

FIG. 2 illustrates a portion of television display system 20 of FIG. 1, partially in electrical schematic form, including a detailed embodiment of high voltage protection circuit 38. In FIG. 2, a source of alternating current mains supply voltage 41 is applied to terminals 42 and 43 of a full-wave bridge rectifier 46. Coupled across terminals 44 and 45 of bridge rectifier 46 is a filter capacitor 47. An unregulated DC supply voltage of, illustratively, +150 volts, is developed at terminal 44 and applied to a voltage regulator 48. Voltage regulator 48 develops a regulated B+ scanning voltage of, illustratively, +123 volts DC, at a terminal 50. A filter capacitor 49 is coupled to terminal 50. The B+ scanning voltage is applied to a horizontal output stage 35 of a horizontal deflection generator 32 through the primary winding 31a of a horizontal or flyback transformer 31.

Horizontal output stage 35 includes a horizontal driver transistor 51, a driver transformer 52, a horizontal output transistor 55, a damper diode 56, a retrace capacitor 57, and an S-shaping or trace capacitor 59 that is series coupled with a horizontal deflection winding $D_x$ across horizontal output transistor 55 and damper diode 56. A horizontal oscillator 34, synchronized by an automatic frequency and phase control circuit 33, provides a horizontal deflection rate square-wave voltage to the base of driver transistor 51. Driver transistor 51 amplifies and inverts the square-wave voltage and applies it to the primary winding of driver transformer 52. Collector supply voltage for driver transistor 51 is obtained from a +185 volt source through a resistor 53. A current limiting resistor 54 is series coupled with the base-emitter junction of transistor 55 across the secondary winding of driver transformer 52.

The amplified and inverted horizontal deflection rate square-wave voltage is applied by driver transformer 52 to turn on transistor 55 during the trace interval and to turn off transistor 55 to initiate the horizontal retrace interval. An RC filter network 89 is coupled across the base-emitter electrodes of horizontal output transistor 55.

A high voltage generator 30 comprises a high voltage winding 31b of flyback transformer 31, diodes 167–169, an ultor terminal U and an ultor filter capacitor 61. The ultor load is represented schematically in FIG. 2 as an impedance 62. Filter capacitor 61 may be replaced by the distributed capacitance of the picture tube conductive coatings 28 and 29 of FIG. 1 if this capacitance is sufficiently large to filter out the undesirable ripple voltage components that may be developed at ultor terminal U.

The retrace pulse voltage developed across horizontal deflection winding $D_x$ is applied to flyback transformer primary winding 31a to develop retrace pulse voltages in high voltage winding 31b and a flyback transformer secondary winding 31c. A DC high voltage or ultor accelerating potential is developed at terminal U from the retrace pulse voltage developed across high voltage winding 31b when rectified by diodes 167–169 and filtered by capacitor 61.

The DC path for ultor beam current flowing from ultor terminal U to ultor load 62 is through high voltage winding 31b, originating at a +26 volt DC supply terminal. The +26 volt DC supply terminal is coupled to the bottom of high voltage winding 31b at a terminal 88 through resistors 64 and 65. A conventional beam limiter circuit 66 is coupled to the junction of resistors 64 and 65 at a terminal 86. A capacitor 63 is coupled to terminal 88 to filter the horizontal rate ripple voltage. The voltage at terminal 88 is representative of the amount of ultor current drawn by load 62 from ultor terminal U. If, for example, the ultor current increases, the voltage at terminal 88 decreases due to the increase in current flowing in resistor 64.

A high voltage protection circuit 38 disables normal television receiver operation under fault conditions such as during the generation of excessive high voltage. Protection circuit 38 includes flyback transformer secondary winding 31c, a beam current signal amplifying transistor 68, a comparator transistor 70, and a latching, disabling transistor 71. A voltage divider comprising resistors 161 and 162 is coupled across secondary winding 31c. The retrace pulse voltage developed across winding 31c is divided and applied to the anode of a rectifier 164 through a resistor 163. The retrace pulse voltage is rectified by a diode 164 and filtered by a capacitor 165 to produce a DC voltage representative of retrace pulse amplitude and thus of the ultor accelerating potential.

The ultor accelerating potential representative voltage is applied through a resistor 166 to the input emitter electrode of comparator 70. A +33 volt reference voltge developed at a terminal 78 is applied through a resistor 77 to the input base electrode of comparator 70. The +33 volt reference voltage is developed across a zener diode 79, with zener bias current supplied from B+ terminal 50 through a resistor 80. A diode 75 is coupled between terminal 78 and the emitter electrode of comparator 70 with the cathode of diode 75 being coupled to the emitter electrode of comparator 70.

Comparator transistor 70 and disabling transistor 71 are of opposite conductivity types with the collector of transistor 70 coupled to the base of transistor 71 and the base of transistor 70 coupled to the collector of transistor 71, thereby forming a regenerative latching arrangement 60. The output or emitter electrode of disabling transistor 71 is coupled to horizontal deflection generator 32 at the base electrode terminal A of horizontal driver transistor 51.

Under normal high voltage and beam current operating conditions, diode 75 is conducting because the voltage developed across capacitor 165 is insufficient to reverse bias the diode junction. With diode 75 conducting, the voltage at the emitter of comparator transistor 70 is one diode voltage drop lower than the voltage at terminal 78, thereby reverse biasing the base-emitter junction of transistor 70. Comparator transistor 70 is nonconductive, preventing any base current from flowing in disabling transistor 71, maintaining transistor 71 in the off state.

Under a fault condition, such as excessive high voltage, the voltage at the emitter electrode of comparator transistor 70 increases sufficiently to at least momentarily reverse bias diode 75 and to forward bias the base-emitter junction of transistor 70. Output current flows from the collector electrode of comparator 70 to energize disabling transistor 71 and regeneratively turn on latch 60 to maintain both transistors regeneratively conducting.

When disabling transistor 71 becomes energized under a fault condition, the emitter current of disabling transistor 71 flows into the base of horizontal driver transistor 51, turning on the driver transistor. Since disabling transistor 71 is continuously conducting due to the energization of latch 60, horizontal driver transistor 51 is also maintained in a continuously conducting state. The horizontal deflection rate switching voltage for horizontal output transistor 55 can no longer be developed. Horizontal output transistor 55 is maintained in the off state and no horizontal scanning current is generated in deflection winding $D_x$. No retrace pulse voltages are developed across the flyback transformer windings and no ultor accelerating potential is thereby generated. A blank picture is observed on the phosphor screen of the picture tube, thereby prompting the observer to turn off the television receiver.

When the television receiver is turned off, B+ voltage is removed from terminal 50, deenergizing the latch and enabling the resumption of normal television receiver operation for transitory fault conditions.

A relatively large valued capacitor 76 is coupled between terminal 78 and the emitter electrode of comparator transistor 70 to prevent a forward biasing voltage from being applied across the base-emitter electrodes of transistor 70 during a transient condition such as may occur initially after turning on the television receiver or during picture tube arcing. A capacitor 74 is coupled directly across the base-emitter electrodes of transistor 70 to provide an RFI pickup bypass during picture tube arcing. An RC filter comprising a resistor 72 and a capacitor 73, each coupled across the base-emitter electrodes of transisor 71, provides filtering of the horizontal rate square-wave voltage normally appearing at terminal A.

A feature of the invention is to provide comparator 70 beam current magnitude information in such a way that the characteristic high voltage disabling or trip curves associated with high voltage protection circuit 38 more closely follow the slope of the high voltage operating curve of high voltage generator 30, such as operating curve 13 illustrated in FIG. 3. Without such beam current information present, typical trip curves for the high voltage protection circuit are rather flat or shallowly sloped, such as illustrated in FIG. 3 by curves 16 and 17.

If the operation of high voltage protection circuit 38 is characterized by such flat-sloped trip curves, tight tolerances must be imposed on the high voltage protection circuit component values in order to obtain an upper limit trip curve located entirely below the isodose curve 12 of FIG. 3, while at the same time maintaining a lower limit trip curve which is located above operating curve 13 at all normal beam current operating levels.

Beam current information may be applied to comparator 70 as an amplified voltage developed at the output collector electrode of amplifier transistor 68 and applied to the input emitter electrode of comparator 70 through a resistor 67. The beam current representative signal voltage developed at terminal 88 is applied to the input base electrode of amplifier transistor 68 through a resistor 83.

DC biasing of amplifier transistor 68 is accomplished by providing base current to the transistor from the zener terminal 78 through a resistor 81 and a resistor 82 of a biasing network 58. Degenerative or negative feedback for amplifier 68 is provided as part of the biasing arrangement by coupling the input base electrode of transistor 68 to the output collector electrode by way of resistor 82 and a diode 84, with the cathode of diode 84 coupled to the collector of transistor 68 and the anode coupled to the junction terminal 87 of resistors 81 and 82. When the negative feedback path is established, current is shunted away from the base of transistor 68 to the collector of the transistor by way of diode 84 in accordance with variations in the signal current flowing in resistor 83.

By biasing amplifier 68 in the manner described, characteristic trip curves such as curves 18 and 19 of FIG. 3 are obtained which have the requisite downward slope or tilt to enable the trip curves to more closely follow the slope of the operating curve. Trip curves 18 and 19 are characteristic of a fault condition wherein, for example, voltage regulator 48 fails to maintain a regulated B+ voltage at terminal 50.

At beam current levels in FIG. 3 below the level $I_1$, for circuits exhibiting a characteristic trip curve 18, and below the level $I_1'$, for circuits exhibiting a characteristic trip curve 19, the biasing of amplifier 68 is such that the beam current signal voltage applied from terminal 88 to the base of transistor 68 maintains the amplifier in a nonlinear, saturated conduction operation.

If amplifier 68 remains in saturated conduction throughout the range of normal beam current levels obtainable during normal operation of the television receiver, a resultant flat-sloped trip curve characteristic such as the characteristic of curve 16 or curve 17 is obtained. To introduce the desired downward slope or tilt to the trip curve, the component values of biasing network 58, principally the values of resistors 81–83, are selected such that for beam current levels greater than $I_1$ or $I_1'$, amplifier 68 is biased out of saturation into linear operation with a characteristic gain established by the negative feedback from elements 82 and 84.

With amplifier 68 biased into linear operation, the output voltage at the collector of transistor 68 increases with increasing beam current levels beyond $I_1$ or $I_1'$. This increasing beam current signal output voltage is applied to the emitter electrode of comparator transistor 70. As a consequence of the increasing positive voltage applied to comparator 70 by the collector of transistor 68, comparator transistor 70 will turn on at an increasing lower ultor voltage during a fault condition, depending upon the actual amount of beam current being drawn during the condition. A downward slope or tilt to the characteristic trip curve, such as curve 18 or curve 19, is thereby introduced, as illustrated in FIG. 3. The steepness of the slope is a function of the gain of amplifier 68 when operated with negative feedback and may be readily adjusted by adjusting the values of resistors 81 and 82.

The adjustment capability available by using biased amplifier 68 may include introducing a more shallow slope to the characteristic trip curve of the protection circuit at the higher beam current levels. A trip curve exhibiting such a shallower slope may be desirable when the operating curve of the high voltage generator exhibits a flat or shallower sloped operating curve, such as may be produced by generators having third harmonically tuned flyback transformers. To provide a shallower slope to the characteristic trip curve, an appropriately buffered inverting stage may be coupled between amplifier transistor 68 and comparator 70 or the output of amplifier 68 may be coupled to the inverting input terminal of comparator 70.

A second feature of the invention is to provide high voltage protection circuit 38 with an overcurrent shutdown capability to disable high voltage generator 30 when excessive beam current is being drawn from ultor terminal U even when the ultor accelerating potential is not excessive. Such an overcurrent condition may arise if the beam limiter circuit fails to operate properly, or during prolonged picture tube arcing, when large amounts of current are being drawn by ultor capacitor 61 and impedance 62.

To provide an overcurrent shutdown capability, biasing network 58 decouples or disables the negative feedback path between the input base electrode and the output collector electrode of amplifier transistor 68 at all beam current levels exceeding a preestablished level. Assume the amount of ultor current drawn from terminal U exceeds the level $I_3$ for $I_3'$ of FIG. 3. Above these beam current levels, the voltage at the collector of transistor 68 has increased sufficiently, relative to the voltage at terminal 87, to reverse bias diode 84, resulting in open loop operation of amplifier 68.

Because the open loop gain of amplifier 68 is much greater than the closed loop negative feedback gain, any further, slight increase in beam current beyond the level $I_3$ or $I_3'$ results in relatively large increases in the output collector voltage of transistor 68 that is applied to comparator 70. At beam current levels beyond $I_3$ or $I_3'$, amplifier transistor 68 becomes biased at or near cutoff. Thus, at beam current levels greater than $I_3$ or $I_3'$, the characteristic trip curve associated with protection circuit 38 assumes a very steep downward slope. The trip curve intersects the operating curve very near the beam current levels of $I_3$ or $I_3'$ to turn on comparator 70 and energize disabling transistor 71. Horizontal deflection generator 32 and high voltage generator 30 are disabled, thereby stopping the flow of ultor current from terminal U.

A capacitor 85 coupled between the base and collector electrodes of transistor 68 filters the beam current representative signal and prevents momentary changes in beam current from unnecessarily energizing latch 60, such as may occur due to changes in the picture information displayed.

By incorporating into the high voltage protection circuit an appropriately biased amplifier to sense ultor current information, the sensitivity of the protection circuit to high voltage shutdown over a substantial range of beam current levels may be readily adjusted and an overcurrent shutdown capability may be readily provided.

What is claimed is:

1. A high voltage generation circuit with high voltage protection for a television display system requiring an ultor accelerating potential and drawing ultor beam current from said high voltage generation circuit, comprising:

a high voltage generator responsive to an alternating current voltage for developing said ultor accelerating potential at an output terminal of said generator;

means coupled to said high voltage generator for developing a signal representative of said ultor accelerating potential;

means responsive to said ultor beam current for developing a signal representative of said ultor beam current;

a comparator;

means coupled to an output terminal of said comparator for developing a disabling signal when energized by said comparator;

means coupled to said disabling signal developing means for applying said disabling signal to said television display system such that an abnormal television display is produced when said disabling signal developing means is energized;

means for applying a reference voltage to an input terminal of said comparator;

means for applying said ultor beam current representative signal to an input terminal of said comparator; and means for applying said ultor accelerating potential representative signal to an input terminal of said comparator for developing an output signal at said output terminal of said comparator which energizes said disabling signal developing means when said ultor accelerating potential exceeds a predetermined value;

characterized in that said ultor beam current representative signal developing means comprises an amplifier having said ultor beam current representative signal developed at an output terminal of said amplifier, means for applying to an input terminal of said amplifier an input signal representative of ultor beam current, and means for biasing said amplifier into substantially linear operation for ultor beam current values within a substantial predetermined range for varying said predetermined value of ultor accelerating potential as said input signal varies and for biasing said amplifier into nonlinear operation for ultor beam current values without said predetermined range in order to develop said comparator output signal substantially independently of said predetermine value of ultor accelerating potential when said ultor beam current exceeds a set amount.

2. A circuit according to claim 1 wherein said amplifier biasing means includes means for establishing a degenerative feedback path between said input and output terminals of said amplifier.

3. A circuit according to claim 2 wherein said amplifier biasing means includes means for decoupling said degenerative feedback path between said input and output terminals of said amplifier when said ultor beam current values are without said predetermined range.

4. A circuit according to claim 3 wherein said biasing means biases said amplifier into saturated conduction when said ultor beam current values are without said predetermined range at one end of said range and biases said amplifier near or at cutoff at the other end of said range.

5. A circuit according to claim 4 wherein said biasing means biases said amplifier near or at cutoff when said ultor beam current exceeds a predetermined value for energizing said disabling signal developing means during an overcurrent operating condition of said television display system.

6. A circuit according to claim 5 including a horizontal deflection generator for developing a retrace pulse voltage, said high voltage generator comprising a flyback transformer with a first winding coupled to said horizontal deflection generator and a high voltage winding coupled to a high voltage rectifier circuit for developing said ultor accelerating potential from the retrace pulse voltage developed across said high voltage winding.

7. A circuit according to claim 6 wherein said means for developing a signal representative of said ultor accelerating potential comprises a secondary winding of said flyback transformer.

8. A circuit according to claim 7 wherein said ultor beam current responsive means comprises a resistance coupled in the DC beam current bath of said high voltage winding.

9. A television receiver protection circuit for ultor accelerating potential and beam current, comprising:

a high voltage generator responsive to an alternating current voltage, including a high voltage transformer for developing an ultor accelerating ptoential at an output terminal of said high voltage generator from the alternating current voltage developed across a high voltage winding of said transformer such that said ultor beam current flows in said high voltage winding to said output terminal;

a comparator;

disabling signal developing means coupled to an output terminal of said comparator for developing a signal to disable normal television receiver operation when said disabling signal developing means is energized by said comparator;

means coupled to said high voltage generator for applying to an input terminal of said comparator a signal representative of said ultor accelerating potential to energize said disabling signal developing means when said ultor accelerating potential exceeds predetermined values;

an amplifier with an output terminal coupled to an input terminal of said comparator;

means coupled to said high voltage generator for developing a signal representative of said ultor beam current;

means for applying said ultor beam current representative signal to an input terminal of said amplifier; and means for biasing said amplifier such that said amplifier exhibits a given gain characteristic over a substantial range of beam current, so as to adjust said predetermined values of said ultor accelerating potential as said ultor beam current changes and exhibits a substantially different gain characteristic outside said substantial range in order to energize said disabling signal developing means when said ultor beam current exceeds a preestablished value in substantial independence of said ultor accelerating potential.

10. A circuit according to claim 9 wherein said biasing means includes means coupled between said input and output terminals of said amplifier for providing said amplifier with negative feedback.

11. A circuit according to claim 10 wherein said biasing means includes means coupled to said negative feedback providing means for disconnecting said negative feedback providing means when said ultor beam current exceeds said preestablished value.

12. A circuit according to claims 9, 10 or 11 wherein said output terminal of said amplifier is coupled to an input terminal of said comparator so as to lower the value of ultor accelerating potential required to energize said disabling signal developing means as said ultor beam current increases in magnitude.

13. A circuit according to claim 12 including a horizontal deflection generator for developing a retrace pulse voltage having a first winding of said transformer coupled to said horizontal deflection generator and said high voltage winding coupled to a high voltage rectifier circuit for developing said ultor accelerating potential from the retrace pulse voltage developed across said high voltage winding.

14. A circuit according to claim 13 wherein said means for applying a signal representative of said ultor accelerating potential comprises a secondary winding of said transformer.

15. A circuit according to claim 14 wherein said ultor beam current representative signal developing means comprises a resistance coupled in the DC beam current path of said high voltage winding.

* * * * *